(12) United States Patent
Masset et al.

(10) Patent No.: US 9,790,839 B2
(45) Date of Patent: Oct. 17, 2017

(54) MOTOR VEHICLE COMPRISING AN INTERNAL COMBUSTION ENGINE AND A FAN ARRANGED IN A LOWER HOUSING CLOSING THE ENGINE COMPARTMENT

(71) Applicant: RENAULT s.a.s., Boulogne-Billancourt (FR)

(72) Inventors: Ludovic Masset, Pacy sur Eure (FR); Vincent Desfeux, Vironvay (FR); Christophe Casen, Saint Pierre la Garenne (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 48 days.

(21) Appl. No.: 14/432,363

(22) PCT Filed: Sep. 24, 2013

(86) PCT No.: PCT/FR2013/052219
§ 371 (c)(1),
(2) Date: Apr. 27, 2015

(87) PCT Pub. No.: WO2014/053736
PCT Pub. Date: Apr. 10, 2014

(65) Prior Publication Data
US 2015/0267601 A1   Sep. 24, 2015

(30) Foreign Application Priority Data

Oct. 2, 2012   (FR) .................................. 12 59324

(51) Int. Cl.
*F01P 5/04* (2006.01)
*B60K 11/06* (2006.01)
(Continued)

(52) U.S. Cl.
CPC ............... *F01P 5/04* (2013.01); *B60K 11/06* (2013.01); *F01P 5/06* (2013.01); *B60K 11/02* (2013.01)

(58) Field of Classification Search
CPC ........ B62D 35/00; B62D 37/02; B60K 11/08; F01P 7/10; F01P 11/10; F01P 1/06;
(Continued)

(56) References Cited

U.S. PATENT DOCUMENTS 2,154,011 A * 4/1939 Reinoehl ................. B60K 5/00
                                                                  123/195 AC
2,322,661 A * 6/1943 Paton ....................... F01P 7/10
                                                                  180/68.1
(Continued)

FOREIGN PATENT DOCUMENTS

DE     43 39 936 A1    6/1995
FR        930 125 A    1/1948
(Continued)

OTHER PUBLICATIONS

International Search Report Issued Jan. 2, 2014 in PCT/FR13/052219 Filed Sep. 24, 2013.
(Continued)

*Primary Examiner* — Hai Huynh
*Assistant Examiner* — Long T Tran
(74) *Attorney, Agent, or Firm* — Oblon, McClelland, Maier & Neustadt, L.L.P.

(57) ABSTRACT

A combustion or hybrid powered motor vehicle including at least one internal combustion engine arranged in an engine compartment, a lower housing configured to enclose a lower portion of the engine compartment, a fan including a vertical axis and an electric motor supplying the fan with electrical
(Continued)

energy, the fan arranged substantially horizontally in the lower housing under the internal combustion engine compartment.

12 Claims, 4 Drawing Sheets

(51) Int. Cl.
  *F01P 5/06* (2006.01)
  *B60K 11/02* (2006.01)
(58) Field of Classification Search
  CPC ............ F01P 2001/005; F01P 2025/60; F01P 2025/66; F01P 5/06; F01P 7/026; F01P 7/048
  USPC ......... 123/41.11, 41.12, 41.49, 41.56, 41.63, 123/41.65, 2, 3
  See application file for complete search history.

(56) References Cited

U.S. PATENT DOCUMENTS

| | | | | |
|---|---|---|---|---|
| 2,742,226 A * | 4/1956 | Mason | .................. | F04D 19/002 123/41.49 |
| 3,995,603 A * | 12/1976 | Thien | ....................... | F01P 3/18 123/41.49 |
| 4,429,666 A * | 2/1984 | Surace | .................. | B60K 11/08 123/41.05 |
| 4,459,087 A * | 7/1984 | Barge | ....................... | F01P 5/04 123/41.12 |
| 5,205,484 A * | 4/1993 | Susa | .................... | B60H 1/3227 123/41.04 |
| 6,129,193 A * | 10/2000 | Link | .................... | B60H 1/3222 192/84.1 |
| 7,784,576 B2 * | 8/2010 | Guilfoyle | ............... | B60K 11/04 123/41.04 |
| 8,251,023 B2 * | 8/2012 | Kardos | .................. | B60K 11/04 123/41.01 |
| 8,789,383 B2 * | 7/2014 | Lawrence | .............. | B60H 1/262 454/136 |
| 2008/0017138 A1 * | 1/2008 | Rogg | .................... | B60K 11/04 123/41.05 |
| 2010/0300791 A1 * | 12/2010 | Kern | .................... | B60K 5/1216 180/229 |
| 2011/0132292 A1 * | 6/2011 | Schwartz | ................ | F01P 7/048 123/41.12 |
| 2012/0112461 A1 * | 5/2012 | Saluccio | .................. | F03D 9/25 290/50 |
| 2012/0247718 A1 * | 10/2012 | Lawrence | .............. | B60H 1/262 165/44 |
| 2012/0292121 A1 | 11/2012 | Murray | | |
| 2012/0323448 A1 * | 12/2012 | Charnesky | ........... | B60K 11/085 701/49 |

FOREIGN PATENT DOCUMENTS

GB 2476279 A 6/2011
JP 61-146635 A 7/1985

OTHER PUBLICATIONS

French Search Report Issued Jun. 20, 2013 in French Application No. 1259324 Filed Oct. 2, 2012.

* cited by examiner

MOTOR VEHICLE COMPRISING AN INTERNAL COMBUSTION ENGINE AND A FAN ARRANGED IN A LOWER HOUSING CLOSING THE ENGINE COMPARTMENT

BACKGROUND

The invention relates to devices for cooling the engine of a motor vehicle with combustion-engine or hybrid propulsion comprising an internal combustion engine.

More particularly, the invention relates to the cooling of the engine compartment overall.

In general, motor vehicles are equipped with an engine compartment incorporating an internal combustion engine closed off by a lower fairing, a heat exchanger, such as a radiator, through which a coolant passes and a fan placed upstream of the heat exchanger in order to blow air toward the engine and thus cool the internal combustion engine when the vehicle is in operation.

Any component able to close off the lower part of the engine compartment, which is generally open, in order to improve the aerodynamics of the vehicle is referred to as a "lower fairing".

However, such a system allows only the front of the combustion engine to be cooled, and the cooled air has difficulty reaching the rear part of the engine, which means that some components of the engine are not sufficiently cooled and may be damaged by the heat.

In addition, when the internal combustion engine is stopped or running at low idle, the components in the engine compartment, and notably those on top of the engine, are subjected to a phenomenon of natural convection. What happens is that when the vehicle is no longer moving along, air situated in the confined region of the engine compartment is heated up to a large extent so that the components are subjected to high thermal stresses and may become damaged by the heat.

Reference may be made to document US 2010/0181050 which describes a vehicle comprising two fans which are intended to cool the front of a combustion engine via a heat exchanger. A first fan is powered by an electric motor and emits air through a heat exchanger. The air emitted by the first fan is recovered to drive a second fan able to convert the mechanical energy into electrical energy and to recharge an electric battery.

However, such a system is difficult to install because the combination of two fans leads to a significant bulk. In addition, such a system is unable to cool all of the components situated in the engine compartment once the vehicle is stopped.

Reference may also be made to document US 2010/0244445 which describes a turbine designed to turn a fan, of substantially horizontal axis, intended to cool the front of a combustion engine via a heat exchanger and to convert the work supplied by the fan turned by the flow of air coming from the outside into electrical energy and recharge an electric battery.

Such a system requires the combination of a turbine and of a fan in order to recharge an electric battery and is likewise unable to cool all of the components situated in the engine compartment once the vehicle is stopped.

BRIEF SUMMARY

It is therefore an object of the present invention to overcome these disadvantages.

The object of the invention is therefore to provide a motor vehicle comprising a device that allows the internal combustion engine compartment to be cooled effectively, while having a small bulk.

Another object of the invention is to provide a device for cooling the internal combustion engine compartment that operates autonomously in terms of electrical energy.

The subject of the present invention is a motor vehicle with combustion-engine or hybrid propulsion comprising at least one internal combustion engine arranged in an engine compartment, a lower fairing intended to close off the lower part of the engine compartment.

The motor vehicle comprises a fan of vertical axis and an electric motor supplying the fan with electrical energy, said fan being arranged substantially horizontally in the lower fairing under the internal combustion engine compartment, so as to blow air in a substantially vertical direction toward the internal combustion engine.

Thus, by incorporating the motor-fan unit directly into the lower fairing, the components arranged in the combustion engine compartment are effectively cooled, even the components arranged around the combustion engine.

According to one embodiment, the electric motor is supplied with electrical energy by the electrical network of the motor vehicle.

According to another embodiment, the electric motor is supplied with electrical energy by an autonomous electrical-energy generation and storage means.

The autonomous electrical-energy generation and storage means may be recharged with electrical energy by the rotation of the fan set in rotation by the movement of a flow of air when the motor vehicle is in motion.

The electric motor is, for example, a DC motor or comprises permanent magnets arranged at the end of the fan and a coil embedded in the lower fairing, the autonomous electrical-energy storage means being recharged with the current induced by the variation in magnetic flux that is created as the fan rotates.

Advantageously, the motor vehicle comprises an electronic control unit able to set the fan in rotation as a function of the temperature measured by a measurement means in the combustion engine compartment.

Furthermore, the motor vehicle may comprise an air intake flap operated by the electronic control unit as a function of the speed of the vehicle, of the state of charge of the autonomous electrical-energy generation and storage means, and of the temperatures measured by at least one measurement means in the internal combustion engine compartment.

According to one embodiment, the engine compartment and the lower fairing are arranged at the rear of the motor vehicle.

Thus, by incorporating the vertical-axis fan into the lower fairing it is easy for internal combustion engines arranged at the rear of the vehicle to be cooled suitably despite the small space which is unable to accommodate a conventional cooling device comprising a heat exchanger and a horizontal-axis fan upstream of the heat exchanger.

Advantageously, the motor vehicle comprises an internal combustion engine cooling device arranged upstream of the internal combustion engine and comprising a heat exchanger through which a coolant circulates and a second fan of horizontal axis arranged upstream or downstream of the heat exchanger and intended to blow or suck air through the heat exchanger in a substantially horizontal direction toward the internal combustion engine.

BRIEF DESCRIPTION OF THE DRAWINGS

Other objects, features and advantages of the invention will become apparent from reading the following description given solely by way of nonlimiting example and given with reference to the attached drawings in which.

DETAILED DESCRIPTION

Figure 1:
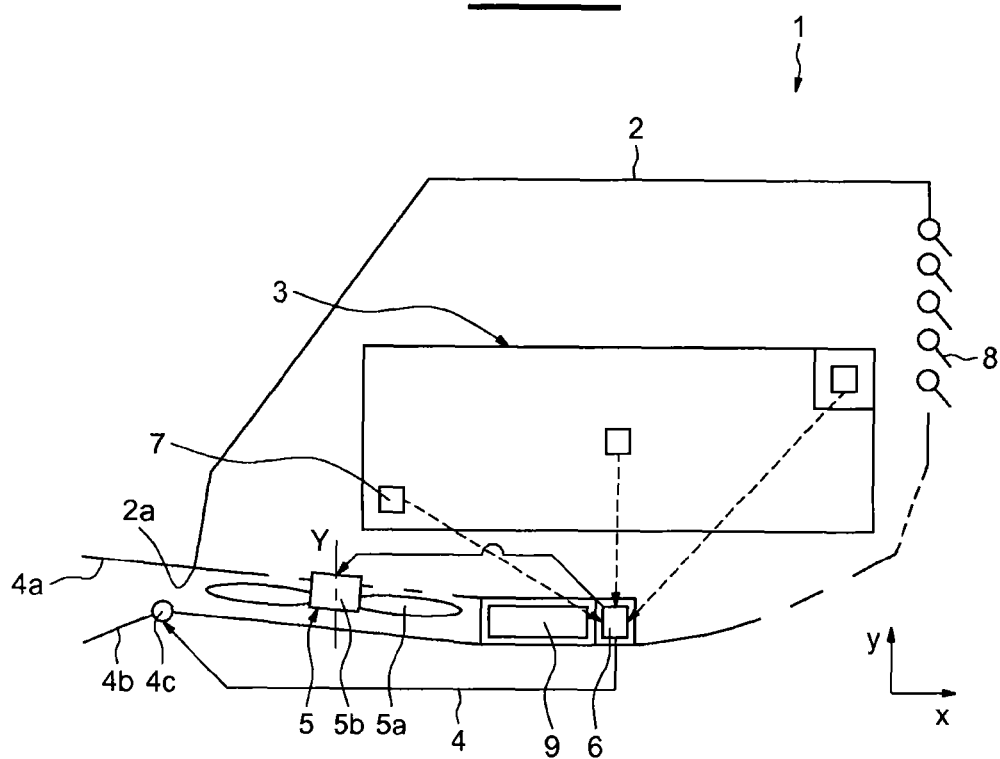
FIG. 1 schematically illustrates a front or rear part of a motor vehicle according to the invention.
Figure 2:
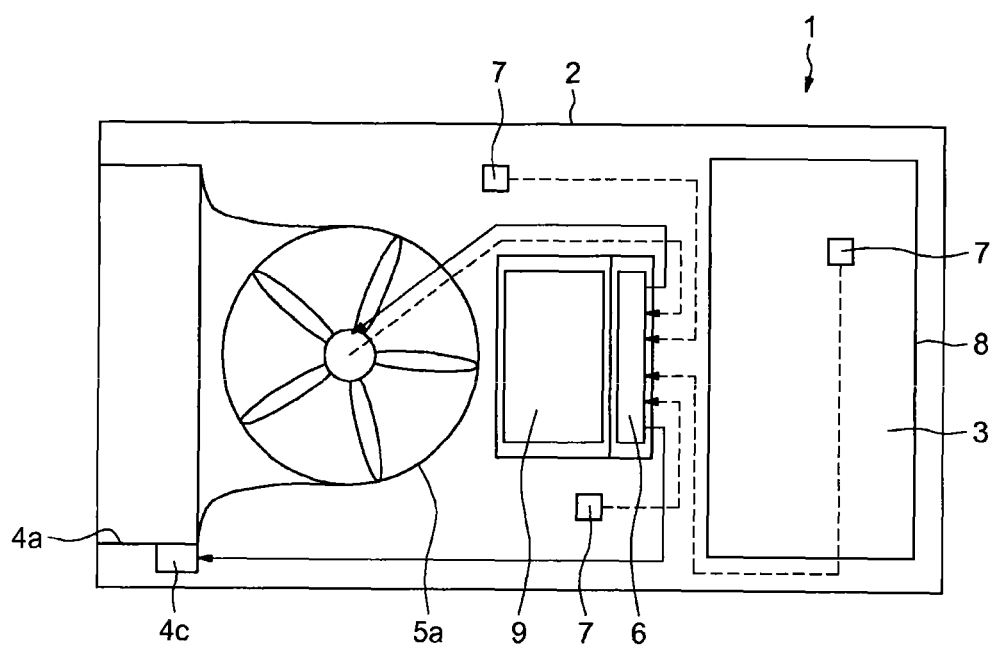
FIG. 2 depicts a view of the vehicle of FIG. 1 from underneath.

FIGS. 1 and 2 schematically illustrate a front or rear part of a motor vehicle with combustion-engine or hybrid propulsion, referenced 1 overall, comprising an engine compartment 2 intended to house the internal combustion engine 3.

The lower part 2a of the engine compartment 2 has an opening closed off by a lower fairing 4. The lower fairing 4 is, for example, an attached component made of synthetic material, such as polypropylene or polyamide for example.

The lower fairing 4 has the effect of improving the aerodynamics of the motor vehicle by reducing or even eliminating the creation of an area of turbulence of the flow of air entering the internal combustion engine 3 compartment 2.

The lower fairing 4 encloses a motor-fan unit 5 comprising a fan 5a of vertical axis Y and an electric motor 5b supplying the fan 5a with electrical energy. The fan 5a is arranged substantially horizontally X in the lower fairing 4 under the internal combustion engine 3 compartment 2 so as to blow fresh air in a substantially vertical direction Y toward the internal combustion engine 3 and notably toward the components situated on top of the internal combustion engine 3.

In the remainder of the description, the term "electric motor" defines all machines that convert electrical energy into mechanical energy or mechanical energy into electrical energy.

As illustrated, the lower fairing comprises a fresh air intake duct 4a and an air intake flap 4b operated by an electronic control unit (ECU) 6 intended to control the opening and closing of the air intake flap 4b, for example by means of actuators 4c, as a function of the temperature in the engine compartment 2 as measured by one or more temperature sensors 7.

When the motor vehicle is in operation, the flow of air admitted by the air intake duct 4a drives the fan 5a which cools the internal combustion engine 3.

When the motor vehicle is stopped or the combustion engine 3 is running at low idle, the air flow is not sufficient to drive the rotation of the fan 5a and the combustion engine 3 compartment 2, through a phenomenon of natural convection, is subjected to high thermal stresses. The fan 5a is therefore set in rotation by the electric motor 5b, making it possible to cool the combustion engine 3 compartment. The air blown by the fan 5a is directed along the vertical axis Y and flows through louvers 8 situated on one side of the combustion engine 3 compartment 2. The name "louvers" is given to any component made up of inclined vanes or slats that allow the hot air present in the engine compartment 2 to be removed.

As illustrated in the figures, the electric motor 5b is supplied with electrical energy by an autonomous electrical-energy generation and storage means 9, such as an electric battery for example.

The autonomous electrical-energy generation and storage means 9 is recharged with electrical energy by the rotation of the fan 5a driven in rotation by the movement of a flow of air when the motor vehicle 1 is in motion, the fan 5a therefore operates in "generator" mode. The flap 4b can also be operated as a function of the speed of the motor vehicle and of the state of charge of the electric battery 9.

When the vehicle 1 is stopped or the internal combustion engine 3 is running at low idle, the autonomous electrical-energy generation and storage means 9 supplies electrical energy to the motor 5b of the fan 5a in order to set it in rotation and the fan 5a then operates in "motor" mode.

The electric motor 5b may for example be a DC motor or may be an AC motor.

As a DC motor is, by definition, reversible, it operates in "generator" mode and in "motor" mode.

Figure 3:
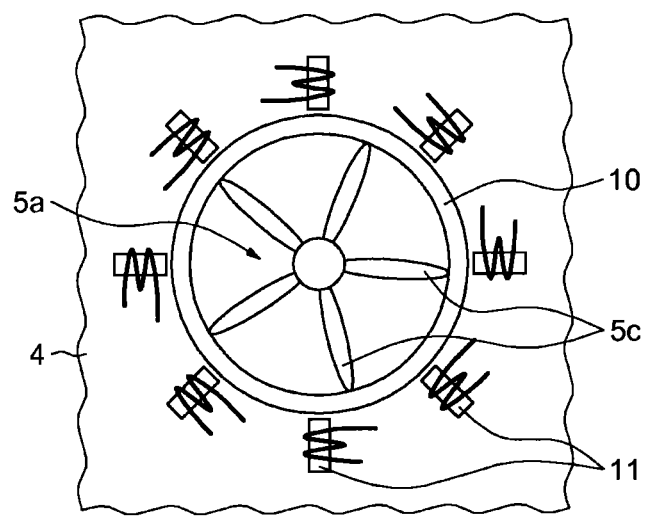
FIG. 3 depicts a ventilation device according to one embodiment of the invention.
Figure 4:
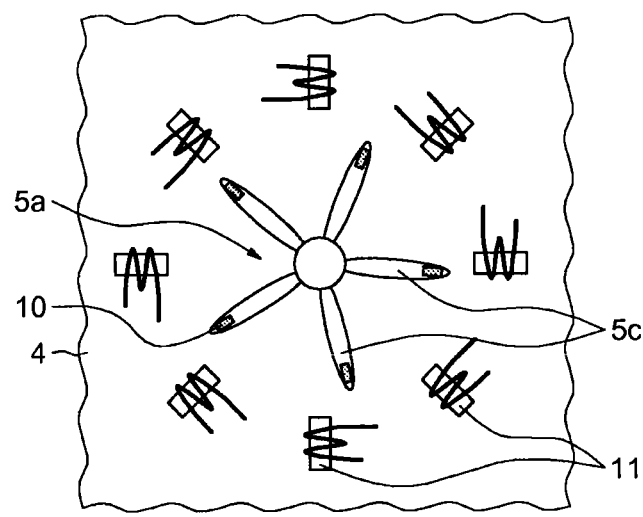
FIG. 4 depicts a ventilation device according to another embodiment of the invention.

As illustrated in FIGS. 3 and 4, the AC motor consists of the combination of magnetized means 10 situated on the circumference of the fan 5a and of coils 11 embedded in the material of the lower fairing 4.

The magnetized means 10 are, for example, in the form of a magnetic ring as illustrated in FIG. 3 or in the form of permanent magnets arranged at the ends of each of the blades 5c of the fan 5a, as illustrated in FIG. 4.

In the case of such an AC motor, the autonomous electrical-energy storage means 9 is recharged by the variation in magnetic flux that is created as the fan 5a rotates. However, it is necessary to have a device (not depicted) for rectifying the alternating current.

The electronic control unit 6 is able to control the "generator" or "motor" mode of operation of the fan as a function of the temperature measured by a measurement means 7 in the combustion engine 3 compartment 2.

When the fan 5a is operating in "motor" mode, the electronic control unit 6 generates a rotary electromagnetic field that allows the fan 5a to be rotated through the collaboration of the magnetized means 10 with the coils 11 embedded in the lower fairing 4.

Figure 5:
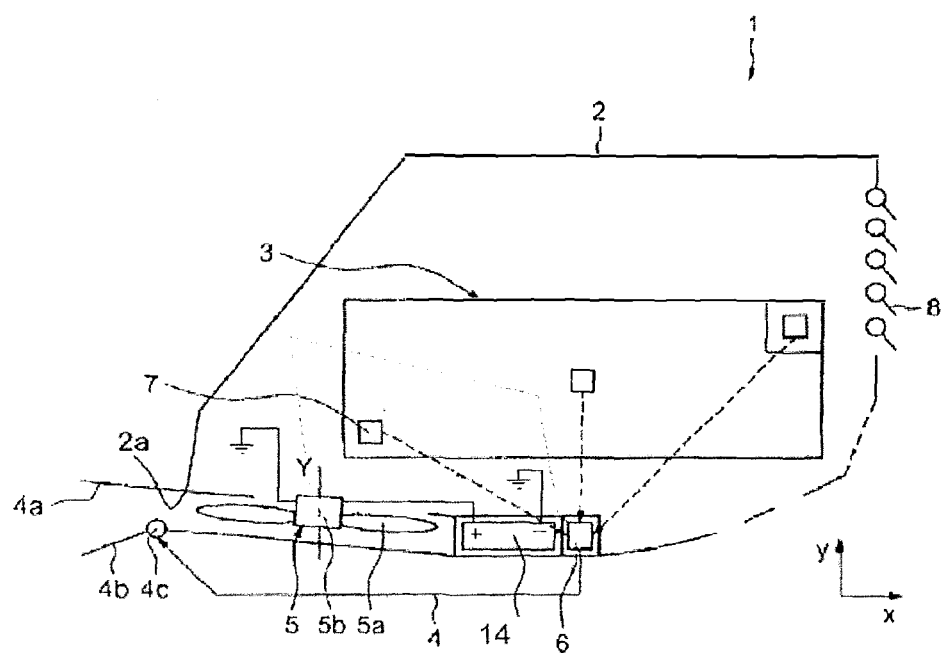
FIG. 5 schematically illustrates a front or rear part of a motor vehicle according to the invention.

As an alternative, the electric motor 5b could be supplied with electrical energy by the electrical network (14 in FIG. 5) of the motor vehicle, without the use of an autonomous electrical-energy generation and storage means 9.

The engine compartment 2 and the lower fairing 4 may be arranged at the rear or at the front of the motor vehicle 1.

Figure 6:
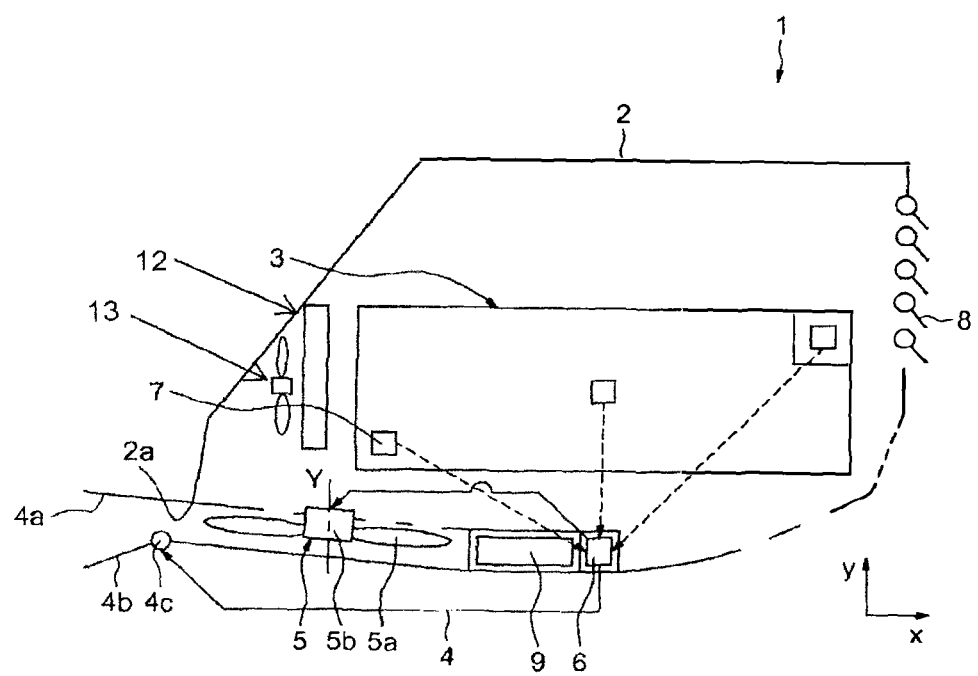
FIG. 6 schematically illustrates a front or rear part of a motor vehicle according to the invention

The motor vehicle 1 may also comprise a conventional device for cooling the internal combustion engine 3 arranged upstream of the internal combustion engine 3 and comprising a heat exchanger (12 in FIG. 6) through which a coolant circulates and a second fan (13 in FIG. 6) arranged upstream or downstream of the heat exchanger and intended to blow or suck air through the heat exchanger in a substantially horizontal direction of the internal combustion engine 3.

Because the motor-fan unit is incorporated directly into the lower fairing, the components housed in the engine compartment are effectively cooled, notably the components arranged on top of the internal combustion engine.

Furthermore, by virtue of the invention, the engine compartment is cooled during the phases in which the combustion engine is running, running at low idle, and stopped.

In addition, because the vertical-axis fan is incorporated into the lower fairing, it is easy to provide internal combustion engines arranged at the rear of the vehicle with sufficient cooling despite the small space which is unable to accommodate a conventional cooling device comprising a heat exchanger and a horizontal-axis fan upstream of the heat exchanger.

The invention claimed is:

1. A motor vehicle with combustion-engine or hybrid propulsion comprising:
   at least one internal combustion engine arranged in an engine compartment;
   a lower fairing configured to close off a lower part of the engine compartment;
   a fan located in the lower fairing and angled upwards such that the fan rotates around a vertical axis to blow air in a vertical direction towards the internal combustion engine; and
   an electric motor supplying the fan with electrical energy, the fan being arranged substantially horizontally in the lower fairing under the internal combustion engine compartment.

2. The motor vehicle as claimed in claim 1, wherein the electric motor is supplied with electrical energy by an electrical network of the motor vehicle.

3. The motor vehicle as claimed in claim 1, wherein the electric motor is supplied with electrical energy by an autonomous electrical-energy generation and storage means.

4. The motor vehicle as claimed in claim 3, wherein the autonomous electrical-energy generation and storage means is recharged with electrical energy by rotation of the fan set in rotation by movement of a flow of air when the motor vehicle is in motion.

5. The motor vehicle as claimed in claim 3, wherein the electric motor is a DC motor.

6. The motor vehicle as claimed in claim 3, further comprising permanent magnets arranged at an end of the fan and a coil embedded in the lower fairing, the autonomous electrical-energy storage means being recharged with current induced by variation in magnetic flux that is created as the fan rotates.

7. The motor vehicle as claimed in claim 1, further comprising an electronic control unit configured to set the fan in rotation as a function of a temperature measured by a measurement means in the combustion engine compartment.

8. The motor vehicle as claimed in claim 7, further comprising an air intake flap operated by the electronic control unit as a function of a speed of the vehicle and of the temperatures measured by the measurement means in the internal combustion engine compartment.

9. The motor vehicle as claimed in claim 8, wherein the air intake flap is positioned upstream from the fan in a longitudinal direction of the vehicle.

10. The motor vehicle as claimed in claim 1, wherein the engine compartment and the lower fairing are arranged at a rear of the motor vehicle.

11. The motor vehicle as claimed in claim 1, further comprising an internal combustion engine cooling device arranged upstream or downstream of the internal combustion engine and comprising a heat exchanger through which a coolant circulates and a second fan of horizontal axis arranged upstream of the heat exchanger and configured to blow or suck air through the heat exchanger in a substantially horizontal direction toward the internal combustion engine.

12. The motor vehicle as claimed in claim 1, wherein the motor vehicle includes louvers positioned downstream from the fan in a longitudinal direction of the vehicle such that the air blown in the vertical direction by the fan towards the internal combustion engine compartment exits the engine compartment through the louvers.

* * * * *